(12) United States Patent
Ishikura et al.

(10) Patent No.: US 11,488,752 B2
(45) Date of Patent: Nov. 1, 2022

(54) FERRITE SINTERED MAGNET

(71) Applicant: TDK Corporation, Tokyo (JP)

(72) Inventors: Tomokazu Ishikura, Tokyo (JP);
Masanori Ikeda, Tokyo (JP);
Yoshitaka Murakawa, Tokyo (JP);
Hiroyuki Morita, Tokyo (JP); Shogo Muroya, Tokyo (JP)

(73) Assignee: TDK Corporation, Tokyo (JP)

( * ) Notice: Subject to any disclaimer, the term of this patent is extended or adjusted under 35 U.S.C. 154(b) by 226 days.

(21) Appl. No.: 17/026,848

(22) Filed: Sep. 21, 2020

(65) Prior Publication Data
US 2021/0090768 A1 Mar. 25, 2021

(30) Foreign Application Priority Data

Sep. 25, 2019 (JP) .............................. JP2019-174199

(51) Int. Cl.
*H01F 1/11* (2006.01)
*C04B 35/26* (2006.01)
*H01F 1/10* (2006.01)

(52) U.S. Cl.
CPC ............ *H01F 1/11* (2013.01); *C04B 35/2633* (2013.01); *H01F 1/10* (2013.01); *C04B 2235/3215* (2013.01); *C04B 2235/3217* (2013.01); *C04B 2235/3409* (2013.01); *C04B 2235/656* (2013.01); *C04B 2235/767* (2013.01); *C04B 2235/78* (2013.01)

(58) Field of Classification Search
CPC ......... H01F 1/10; H01F 1/11; C04B 35/2633; C04B 2235/3217; C04B 2235/767; C04B 2235/3409; C04B 2235/78; C04B 2235/3215

See application file for complete search history.

(56) References Cited

U.S. PATENT DOCUMENTS

2007/0194269 A1 8/2007 Kobayashi et al.

FOREIGN PATENT DOCUMENTS

| EP | 2 860 166 A1 | 4/2015 |
| JP | 2001-085210 A | 3/2001 |
| JP | 2006-104050 A | 4/2006 |

OTHER PUBLICATIONS

Indian Office Action issued in Indian Patent Application No. 202044041085 dated Aug. 18, 2021.

*Primary Examiner* — C Melissa Koslow
(74) *Attorney, Agent, or Firm* — Faegre Drinker Biddle & Reath LLP

(57) ABSTRACT

The present invention provides a ferrite sintered magnet comprising ferrite crystal grains having a hexagonal structure, wherein the ferrite sintered magnet comprises metallic elements at an atomic ratio represented by formula (1). In formula (1), R is at least one element selected from the group consisting of Bi and rare-earth elements, and R comprises at least La. In formula (1), w, x, z and m satisfy formulae (2) to (5). The above-mentioned ferrite sintered magnet further has a coefficient of variation of a size of the crystal grains in a section parallel to a c axis of less than 45%.

$$Ca_{1-w-x}R_wSr_xFe_zCo_m \quad (1)$$

$$0.360 \le w \le 0.420 \quad (2)$$

$$0.110 \le x \le 0.173 \quad (3)$$

$$8.51 \le z \le 9.71 \quad (4)$$

$$0.208 \le m \le 0.269 \quad (5)$$

4 Claims, 1 Drawing Sheet

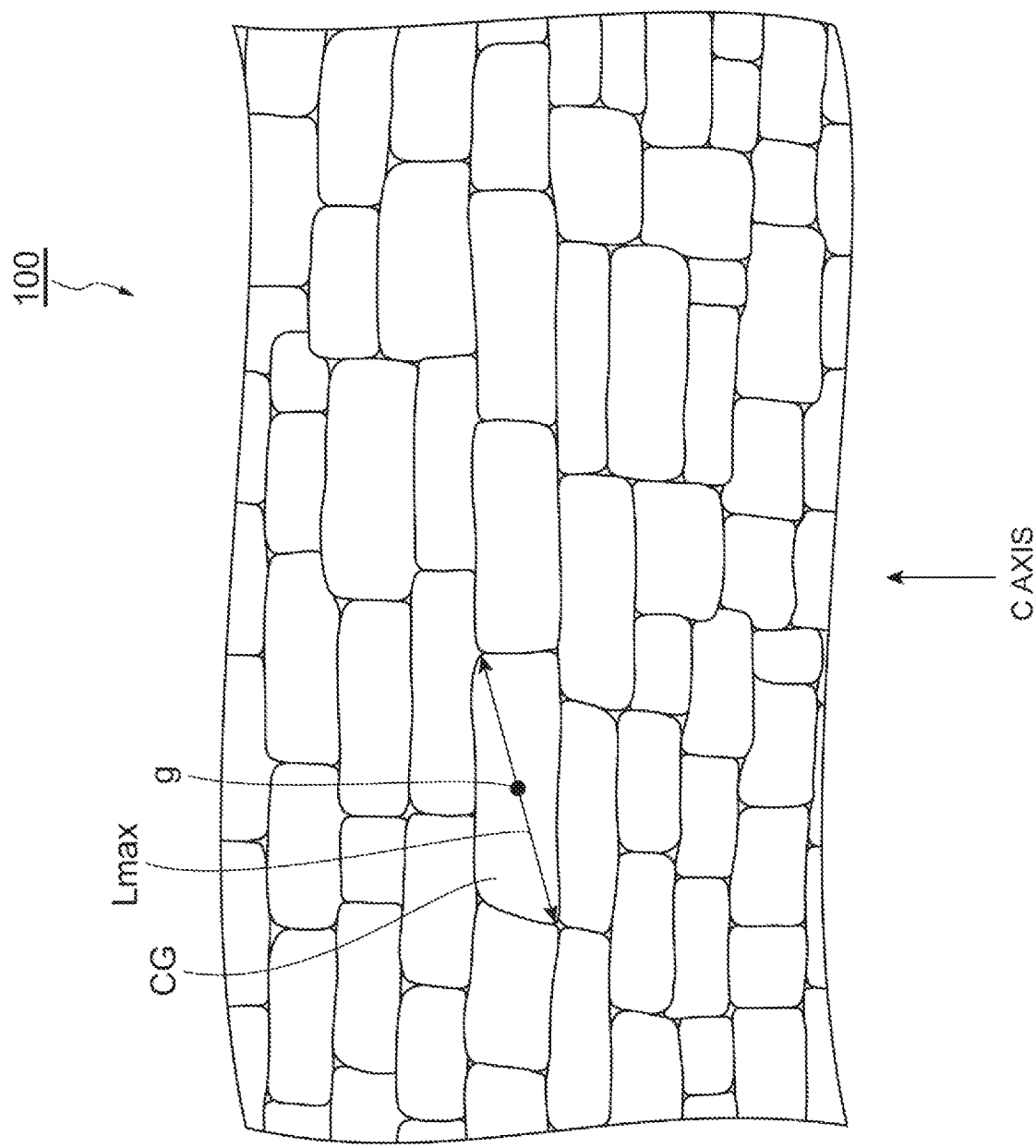

FERRITE SINTERED MAGNET

TECHNICAL FIELD

The present invention relates to a ferrite sintered magnet.

BACKGROUND

A hexagonal M type (magnetoplumbite type) Sr ferrite or Ba ferrite is known as a raw material of permanent magnets made of oxides. Ferrite magnets made of these ferrites are presented as permanent magnets in the form of ferrite sintered magnets or bonded magnets. With the downsizing of electronic components and enhancement in their performance in recent years, ferrite magnets are also being required to have high magnetic properties in spite of the small size thereof.

As indices of magnetic properties of permanent magnets, residual magnetic flux density (Br) and coercive force (HcJ) are generally used, and it is estimated that as they become higher, permanent magnets have higher magnetic properties. Until now, from the viewpoint of improving the Br and the HcJ of permanent magnets, examination has been performed by changing the composition, such as by incorporating specific elements into ferrite magnets.

For example, in Patent Literature 1, an oxide magnetic material and a sintered magnet which enable the Br and the HcJ to improve by incorporating at least La and Co in an M type Ca ferrite are disclosed.

CITATION LIST

Patent Literature

[Patent Literature 1] Japanese Unexamined Patent Publication No. 2006-104050

SUMMARY

As mentioned above, there have been various attempts of changing combinations of elements added to the main composition in order to obtain both Br and HcJ satisfactorily, but it has not been revealed yet what combinations of additional elements give high properties.

Moreover, even though the compositions are the same, the sintering temperature may affect the magnetic properties of magnets greatly. Therefore, the allowable range of sintering temperature may have to be narrowed to obtain stable magnetic properties in light of steps of manufacturing magnets, which makes manufacturing management difficult.

The present invention has been completed in light of the above-mentioned circumstances, and an object thereof is to provide a ferrite sintered magnet which has only a small dependence on sintering temperature and enables obtaining excellent magnetic properties stably.

The present invention provides a ferrite sintered magnet comprising ferrite crystal grains having a hexagonal structure, wherein the above-mentioned ferrite sintered magnet comprises metallic elements at an atomic ratio represented by formula (1):

$$Ca_{1-w-x}R_wSr_xFe_zCo_m \quad (1)$$

wherein R is at least one element selected from the group consisting of Bi and rare-earth elements;
R comprises at least La;
w, x, z and m satisfy formulae (2) to (5):

$$0.360 \leq w \leq 0.420 \quad (2)$$

$$0.110 \leq x \leq 0.173 \quad (3)$$

$$8.51 \leq z \leq 9.71 \quad (4)$$

$$0.208 \leq m \leq 0.269 \quad (5);\ \text{and}$$

a coefficient of variation of a size of crystal grains in a section parallel to a c axis is less than 45%. Products having only a small dependence on sintering temperature and stable magnetic properties are easily manufactured from the above-mentioned ferrite sintered magnet.

The above-mentioned ferrite sintered magnet can further comprise 0.037 to 0.181% by mass of B in terms of $H_3BO_3$. Therefore, products having only a small dependence on calcination temperature and stable magnetic properties are easily manufactured.

It is preferable that the above-mentioned ferrite sintered magnet further comprise 0.03 to 0.3% by mass of Al in terms of $Al_2O_3$. The HcJ can be further improved by incorporating Al into the ferrite sintered magnet in the above-mentioned range.

The above-mentioned ferrite sintered magnet may further comprise 0.001 to 0.068% by mass of Ba in terms of BaO. Even though the ferrite sintered magnet comprises Ba in the above-mentioned range, the HcJ of the ferrite sintered magnet can be maintained at a high value. However, when it comprises more than 0.068% by mass of Ba in terms of BaO, the sintering temperature dependence tends to deteriorate, and the coercive force also tends to decrease.

According to the present invention, a ferrite sintered magnet which has only a small dependence on sintering temperature and enables obtaining stable magnetic properties and a method for manufacturing the same can be provided.

BRIEF DESCRIPTION OF THE DRAWINGS

FIG. 1 is an enlarged schematic diagram of the section of a surface parallel to the c axis of a ferrite sintered magnet according to an embodiment of the present invention.

DETAILED DESCRIPTION

Suitable embodiments of the present invention will be described hereinafter. However, the present invention is not limited to the following embodiments.

(Ferrite Sintered Magnet)

A ferrite sintered magnet according to the present embodiment comprises ferrite particles (crystal grains) which have a hexagonal structure. It is preferable that the above-mentioned ferrite be a magnetoplumbite type ferrite (M type ferrite).

The ferrite sintered magnet according to the present embodiment is an oxide comprising metallic elements at an atomic ratio represented by formula (1).

$$Ca_{1-w-x}R_wSr_xFe_zCo_m \quad (1)$$

In formula (1), R is at least one element selected from the group consisting of Bi and rare-earth elements (including Y); and R comprises at least La.

Additionally, in formula (1), w, x, z and m satisfy formulae (2) to (5). Since the w, the x, the z and the m satisfy formulae (2) to (5), the ferrite sintered magnet can have stable excellent residual magnetic flux density Br and coercive force HcJ.

$$0.360 \leq w \leq 0.420 \quad (2)$$

$$0.110 \leq x \leq 0.173 \quad (3)$$

$$8.51 \leq z \leq 9.71 \quad (4)$$

$$0.208 \leq m \leq 0.269 \quad (5)$$

The ferrite sintered magnet according to the present embodiment has a coefficient of variation of the size of the crystal grains in a section parallel to the c axis of less than 45%.

The composition of the ferrite sintered magnet according to the present embodiment and the like will be described more specifically hereinafter.

It is preferable that the coefficient (1-w-x) of Ca at the atomic ratio of the metallic elements in the ferrite sintered magnet according to the present embodiment be more than 0.435 and less than 0.500. When the coefficient (1-w-x) of Ca is more than 0.435, a ferrite is easily formed into an M type ferrite. The ratios of non-magnetic phases such as $\alpha$-$Fe_2O_3$ are not only reduced, but also the production of non-magnetic different phases such as orthoferrite due to surplus of R is suppressed, and suppress deterioration in magnetic properties (especially Br or HcJ). It is more preferable that the coefficient (1-w-x) of Ca be 0.436 or more, and it is still more preferable that it be more than 0.445 from the same viewpoint. Meanwhile, when the coefficient (1-w-x) of Ca is less than 0.500, a ferrite is not only easily formed into an M type ferrite, but also non-magnetic phases such as $CaFeO_{3-x}$ are reduced, and excellent magnetic properties are easily obtained. It is more preferable that the coefficient (1-w-x) of Ca be 0.491 or less from the same viewpoint.

R at the atomic ratio of the metallic elements in the ferrite sintered magnet according to the present embodiment is at least one element selected from the group consisting of Bi and rare-earth elements, and R comprises at least La. Examples of the rare-earth elements include La, Ce, Pr, Nd, Sm, Eu, Gd, Tb, Dy, Ho, Er, Tm, Yb, Lu and Y. It is preferable that the R be La. The anisotropic magnetic field can be improved when the R is La.

The coefficient (w) of the R at the atomic ratio of the metallic elements in the ferrite sintered magnet according to the present embodiment is 0.360 or more and 0.420 or less. When the coefficient (w) of the R is in the above-mentioned range, favorable Br, HcJ and squareness ratio, Hk/HcJ, can be obtained. When the coefficient (w) of the R is 0.360 or more, the solid solution amount of Co in the ferrite sintered magnet is enough, and decreases in Br and HcJ can be suppressed. It is preferable the coefficient (w) of the R be more than 0.370, and it is more preferable that it be 0.380 or more from the same viewpoint. Meanwhile, when the coefficient (w) of the R is 0.420 or less, the production of non-magnetic different phases such as orthoferrite can be suppressed, and the ferrite sintered magnet can be made a practical one, the HcJ of which is high. It is preferable that the coefficient (w) of the R be less than 0.410 from the same viewpoint.

The coefficient (x) of Sr at the atomic ratio of the metallic elements in the ferrite sintered magnet according to the present embodiment are 0.110 or more and 0.173 or less.

When the coefficient (x) of Sr is in the above-mentioned range, favorable Br, HcJ and Hk/HcJ can be obtained. When the coefficient (x) of Sr is 0.110 or more, the ratio of Ca and/or La reduces, and a decrease in HcJ can be suppressed. Meanwhile, when the coefficient (x) of Sr is 0.173 or less, sufficient Br and HcJ are easily obtained. It is preferable that the coefficient (x) of Sr be less than 0.170, and it is more preferable that it be less than 0.165 from the same viewpoint.

The coefficient (z) of Fe at the atomic ratio of the metallic elements in the ferrite sintered magnet according to the present embodiment is 8.51 or more and 9.71 or less. Since the coefficient (z) of Fe is in the above-mentioned range, favorable Br, HcJ and Hk/HcJ can be obtained. It is preferable that the coefficient (z) of Fe be more than 8.70 and less than 9.40 from the viewpoint of obtaining more favorable HcJ. It is preferable that the coefficient (z) of Fe be more than 8.90 and less than 9.20 from the viewpoint of obtaining more favorable Hk/HcJ.

The coefficient (m) of Co at the atomic ratio of the metallic elements in the ferrite sintered magnet according to the present embodiment is 0.208 or more and 0.269 or less. When the coefficient (m) of Co is 0.208 or more, more excellent HcJ can be obtained. It is preferable that the coefficient (m) of Co be more than 0.210, it is more preferable that it be more than 0.220, and it is still more preferable that it be 0.250 or more from the same viewpoint. Meanwhile, when the coefficient (m) of Co is 0.269 or less, more excellent Br can be obtained. It is preferable that the coefficient (m) of Co be 0.250 or less from the same viewpoint. The anisotropic magnetic field can be improved by incorporating Co into the ferrite sintered magnet.

The ferrite sintered magnet according to the present embodiment has a coefficient of variation (CV value) of the size of the crystal grains in a section parallel to the c axis of less than 45%.

The c axis is an axis of easy magnetization. A schematic diagram of a section parallel to the c axis of a ferrite sintered magnet 100 is shown in FIG. 1. The ferrite sintered magnet 100 has many crystal grains CG having a ferrite structure.

The size of each crystal grain herein is the maximum value Lmax of the overlapping length of the crystal grain CG and a straight line passing along the center of gravity g of the crystal grain CG. The number of samples of crystal grains n may be 500.

The coefficient of variation (CV value) is a value ($\sigma$/AV) obtained by dividing the standard deviation $\sigma$ of the size of the crystal grains by arithmetic mean of the size of crystal grains AV. A low coefficient of variation means a little variation in the size of the crystal grains.

The coefficient of variation of the size of the crystal grains in a section parallel to the c axis may be 40% or less, may be 35% or less, or may be 30% or less.

When the coefficient of variation is less than 45%, the dependence of HcJ on the sintering temperature can be reduced and the variation in HcJ in products can be suppressed. The coefficient of variation may be 44% or less, 43% or less, 42% or less, 41% or less, or 40% or less.

The ferrite sintered magnet according to the present embodiment can comprise B (boron) as a component other than the above-mentioned metallic elements. The content of B in the ferrite sintered magnet is 0.037% by mass or more and 0.181% by mass or less in terms of $H_3BO_3$. The dependence of HcJ on calcination temperature can be reduced by incorporating B into the ferrite sintered magnet at 0.037% by mass or more in terms of $H_3BO_3$. It is preferable that the content of B be 0.050% by mass or more, and it is more preferable that it be 0.070% by mass or more in terms of $H_3BO_3$ from the same viewpoint. Meanwhile, high HcJ can be maintained by adjusting the content of B in the ferrite sintered magnet to 0.181% by mass or less in terms of $H_3BO_3$. It is preferable that the content of B be 0.165% by mass or less, and it is more preferable that it be 0.150% by mass or less in terms of $H_3BO_3$ from the same viewpoint.

The ferrite sintered magnet according to the present embodiment further may comprise Al (aluminum). It is preferable that the content of Al in a ferrite sintered magnet be 0.03% by mass or more and 0.3% by mass or less in terms of $Al_2O_3$. The grain growth at the time of calcination and sintering is suppressed, and the obtained coercive force of the ferrite sintered magnet is further improved by incorporating 0.03% by mass or more of Al into the ferrite sintered magnet in terms of $Al_2O_3$. It is preferable that the content of Al be 0.10% by mass or more in terms of $Al_2O_3$ from the same viewpoint. Meanwhile, excellent Br and HcJ can be obtained by adjusting the content of Al in the ferrite sintered magnet to 0.3% by mass or less in terms of $Al_2O_3$.

The ferrite sintered magnet according to the present embodiment can further comprise Si (silicon). The content of Si in the ferrite sintered magnet can be 0.1 to 3% by mass in terms of $SiO_2$. High HcJ is easily obtained by incorporating Si into the ferrite sintered magnet in the above-mentioned range. The content of Si may be 0.5 to 1.0% by mass in terms of $SiO_2$ from the same viewpoint.

The ferrite sintered magnet according to the present embodiment may further comprise Ba (barium). When the ferrite sintered magnet comprises Ba, the content of Ba in the ferrite sintered magnet can be 0.001 to 0.068% by mass in terms of BaO. Even though the ferrite sintered magnet comprises Ba in the above-mentioned range, the HcJ of the ferrite sintered magnet can be maintained at a high value. However, when it comprises Ba at more than 0.068% by mass in terms of BaO, the sintering temperature dependence tends to deteriorate, and the coercive force also tends to decrease.

The ferrite sintered magnet according to the present embodiment may further comprise Cr, Ga, Mg, Cu, Mn, Ni, Zn, In, Li, Ti, Zr, Ge, Sn, V, Nb, Ta, Sb, As, W, Mo and the like. It is preferable that the content of each element be 3% by mass or less, and it is still more preferable that it be 1% by mass or less in terms of an oxide. It is preferable that the total content of these elements be 2% by mass or less from the viewpoint of avoiding deterioration in magnetic properties.

It is preferable that the ferrite sintered magnet according to the present embodiment do not comprise alkali metal elements (Na, K, Rb and the like). Alkali metal elements tend to reduce the saturation magnetization of the ferrite sintered magnet easily. However, for example, alkali metal elements may be included in raw materials for obtaining a ferrite sintered magnet, and as long as the amounts thereof are such amounts as to be included inevitably, they may be included in the ferrite sintered magnet. The content of alkali metal elements which does not influence magnetic properties greatly is 3% by mass or less.

The composition of the ferrite sintered magnet can be measured by fluorescence X-rays quantitative analysis. The existence of the main phase can be confirmed by X-ray diffraction or electron diffraction.

The average size of the crystal grains in the ferrite sintered magnet according to the present embodiment is preferably 2.0 µm or less, more preferably 1.7 µm or less, and further preferably 1.5 µm or less. High HcJ is easily obtained when the crystal grains have such an average size. The average size of the crystal grains of the ferrite sintered magnet is an arithmetic mean of the size of 500 crystal grains measured by the above-mentioned definition.

(Method for Manufacturing Ferrite Sintered Magnet)

An example of a method for manufacturing a ferrite sintered magnet according to the present embodiment will be shown hereinafter. The above-mentioned manufacturing method comprises a raw material powder preparation step, a calcination step, a pulverization step, a molding step and a firing step. The manufacturing method may comprise a finely pulverized slurry drying step and a kneading step between the pulverization step and the molding step, and may comprise a degreasing step between the molding step and the firing step. Steps will be described hereinafter.

<Raw Material Powder Preparation Step>

In the raw material powder preparation step, the raw materials of a ferrite sintered magnet are mixed, and pulverized if needed to obtain a raw material powder. Examples of the raw materials of the ferrite sintered magnet include compounds (raw material compounds) comprising one or two or more of the elements constituting the magnet. It is suitable that raw material compounds are, for example, powdered. Examples of the raw materials compounds include oxides of the elements and compounds which turn into oxides by firing (carbonates, hydroxides, nitrates or the like). Examples thereof include $SrCO_3$, $La_2O_3$, $Fe_2O_3$, $BaCO_3$, $CaCO_3$, $Co_3O_4$, $H_3BO_3$, $Al_2O_3$ and $SiO_2$.

Each raw material is weighed, for example, so that the composition of a desired ferrite sintered magnet is obtained, and mixed; and then mixed and pulverized using a wet attritor or a ball mill around 0.1 to 20 hours. It is preferable that the average particle size of the powder of the raw material compounds be around 0.1 to 5.0 µm, for example, from the viewpoint of enabling uniform blending. It is suitable to mix raw materials for a long period of time, achieve homogenous composition distribution, and realize uniform grain growth at the time of calcination or sintering from the viewpoint of reducing the firing temperature dependence of the magnetic properties by reducing the coefficient of variation in the size of the crystal grains of the ferrite sintered magnet.

The raw material powder comprises at least Ca, R, Sr, Fe and Co. When the ferrite sintered magnet comprises B, the raw material powder comprises B. When the raw material powder comprises B, the influence of variation in calcination temperature on magnetic properties is easily reduced. When the ferrite sintered magnet comprises Al, the raw material powder further comprises Al. Therefore, the grain growth at the time of calcination and sintering can be suppressed, the magnetic properties can be improved, and the calcination and sintering temperature dependence of the magnetic properties can be reduced.

Some of the raw materials can be also added in the below-mentioned pulverization step. However, it is preferable that none of the raw materials be added in the pulverization step in the present embodiment. That is, it is preferable that all of Ca, R, Sr, Fe, Co and B constituting the obtained ferrite sintered magnet (except elements mixed inevitably) be supplied from the raw material powder in the raw material powder preparation step. It is preferable especially that all of B constituting the ferrite sintered magnet be supplied from the raw material powder in the raw material powder preparation step. It is preferable that all of Al constituting the ferrite sintered magnet be supplied from the raw material powder in the raw material powder preparation step. Therefore, the above-mentioned effects by incorporating B or Al into the raw material powder is more easily obtained.

<Calcination Step>

In the calcination step, the raw material powder obtained in the raw material powder preparation step is calcined. It is preferable that calcination be performed in an oxidizing atmosphere such as the air. It is preferable that the temperature of calcination be in the temperature range of 1100 to 1400° C., it is more preferable that the temperature of calcination be 1100 to 1300° C., and it is further preferable that the temperature of calcination be 1150 to 1240° C. from the viewpoint of reducing the firing temperature dependence of the magnetic properties by reducing the coefficient of variation in the size of the crystal grains of the ferrite sintered magnet. In a method for manufacturing a ferrite sintered magnet comprising B, stable magnetic properties are easily obtained also at any of the above-mentioned calcination temperatures. The calcination time (time for which it is maintained at the calcination temperature) can be 1 second to 10 hours, and it is preferable that it be 1 second to 5 hours. A calcined body obtained by calcination comprises the main phase (M phase) as mentioned above at 70% or more. The primary particle size of the calcined body is preferably 5 μm or less, more preferably 2 μm or less, and still more preferably 1 μm or less. The HcJ of the obtained ferrite sintered magnet can be further improved by suppressing grain growth in calcination and reducing the primary particle size of the calcined body, for example, to 1 μm or less.

<Pulverization Step>

In the pulverization step, the calcined body which has become granular or massive at the calcination step is pulverized and powdered again. Therefore, molding in the below-mentioned molding step is performed easily. In this pulverization step, raw materials which are not mixed in the raw material powder preparation step may be further added. However, it is preferable that all the raw materials be mixed in the raw material powder preparation step from the viewpoint of obtaining the effect of calcination temperature dependence or the effect of suppressing crystal grain growth in calcination. The pulverization step may have two steps of pulverizing the calcined body into coarse powder (coarse pulverization) and then pulverizing this still finer (fine pulverization).

Coarse pulverization is performed to an average particle size of 0.5 to 5.0 μm, for example, using a vibrating mill or the like. In the fine pulverization, the coarsely pulverized material obtained by coarse pulverization is further pulverized by a wet attritor, a ball mill, a jet mill or the like. In fine pulverization, fine pulverization is performed so that the average particle size of the obtained finely pulverized material is preferably around 0.08 to 2.0 μm, more preferably around 0.1 to 1.0 μm, and still more preferably around 0.1 to 0.5 μm. It is preferable that the specific surface area of the finely pulverized material (determined, for example, by the BET method) be around 4 to 12 m²/g. Suitable pulverization time varies according to the pulverization method, and, for example, it is preferable that it be around 30 minutes to 20 hours in the case of a wet attritor and that it be around 10 to 50 hours in wet milling by a ball mill.

In the fine pulverization step, a non-aqueous dispersion medium such as toluene or xylene can be used besides water as a dispersion medium in the case of a wet method. When a non-aqueous dispersion medium is used, high orientation tends to be obtained at the time of the below-mentioned wet molding. Meanwhile, when an aqueous dispersion medium is used, it is advantageous from the viewpoint of productivity.

In the fine pulverization step, for example, a polyhydric alcohol represented by the formula $C_n(OH)_nH_{n+2}$ may be added as a dispersant to increase the orientation degree of the sintered body obtained after firing. As the polyhydric alcohol, it is preferable that the n be 4 to 100, it is more preferable that it be 4 to 30, it is still more preferable that it be 4 to 20, and it is particularly preferable that it be 4 to 12 in the formula. Examples of the polyhydric alcohol include sorbitol. Two or more polyhydric alcohols may be used in combination. In addition to the polyhydric alcohol, other well-known dispersants may be further used in combination.

When the polyhydric alcohol is added, it is preferable that the amount thereof added be 0.05 to 5.0% by mass, it is more preferable that it be 0.1 to 3.0% by mass, and it is still more preferable that it be 0.2 to 2.0% by mass on the basis of an object to which it is added (for example, the coarsely pulverized material). The polyhydric alcohol added in the fine pulverization step is removed by thermal decomposition in the below-mentioned firing step.

<Molding Step>

In the molding step, the pulverized material (preferably finely pulverized material) obtained after the pulverization step is molded in a magnetic field to obtain a green compact. Molding can be performed by either method of dry molding and wet molding. It is preferable to perform wet molding from the viewpoint of increasing the degree of magnetic orientation.

When molding is performed by wet molding, it is preferable, for example, to obtain slurry by performing the above-mentioned fine pulverization step by a wet process, then concentrate this slurry to a predetermined concentration to obtain slurry for wet molding, and perform molding using this. Concentration of slurry can be performed by centrifugal separation, a filter press or the like. It is preferable that finely pulverized material represent around 30 to 80% by mass of the total amount of the slurry for wet molding. In this case, a surfactant such as gluconic acid, gluconate or sorbitol may be added to the slurry. A non-aqueous dispersion medium may be used as the dispersion medium. As the non-aqueous dispersion medium, organic dispersion medium such as toluene and xylene can be used. In this case, it is preferable to add a surfactant such as oleic acid. The slurry for wet molding may also be prepared by adding a dispersion medium and the like to dry finely pulverized material after fine pulverization.

In the wet molding, this slurry for wet molding is next molding in a magnetic field. In that case, it is preferable that molding pressure be around 9.8 to 49 MPa (0.1 to 0.5 ton/cm²), and it is preferable that the magnetic field to apply be around 398 to 1194 kA/m (5 to 15 kOe).

<Firing Step>

In the firing step, the green compact obtained in the molding step is fired into a sintered body. Therefore, a sintered body of the ferrite magnet as mentioned above, namely a ferrite sintered magnet, is obtained. Firing can be performed in an oxidizing atmosphere such as the air atmosphere. It is preferable that firing temperature be 1050 to 1270° C., and it is more preferable that it be 1080 to 1240° C. It is preferable that firing time be around 0.5 to 3 hours.

When the green compact is obtained by the wet molding as mentioned above, rapidly heating this green compact without full drying may volatilize the dispersion medium and the like extremely and crack the green compact. Then, it is preferable to suppress the occurrence of a crack, for example, by heating the green compact at a low rate of temperature increase of around 1° C./minute from room temperature to around 100° C. and fully drying it before it reaches the above-mentioned sintering temperature from the viewpoint of avoiding such inconvenience. Additionally, when a surfactant (dispersant) and the like are added, it is preferable to fully remove them (degreasing treatment), for example, by heating the green compact at a rate of temperature increase of around 3° C./minute in the temperature range of around 100 to 500° C. These treatments may be performed at the start of the firing step, and may be performed before the firing step separately.

The suitable method for manufacturing a ferrite sintered magnet was described above; however, as long as the ferrite sintered magnet of the present invention is manufactured, the manufacturing method is not limited to the manufacturing method described above, and conditions can be changed properly.

The shape of the ferrite sintered magnet is not particularly limited. The ferrite sintered magnet may have a plate shape such as a disk shape, may have a pillar shape such a round column or a quadrangular prism, may have a shape such as a C shape, a bow shape and an arch shape, and may have a ring shape.

The ferrite sintered magnet according to the present embodiment can be used, for example, for rotating electrical machines such as motors and dynamos, various sensors and the like.

EXAMPLES

Although the present invention will be described still more specifically hereinafter, the present invention is not limited to the following Examples.

(Manufacturing of Ferrite Sintered Magnet)

Example 1

<Raw Material Powder Preparation Step>

As raw materials of metallic elements constituting a ferrite sintered magnet, calcium carbonate ($CaCO_3$), lanthanum oxide ($La_2O_3$), strontium carbonate ($SrCO_3$), iron oxide ($Fe_2O_3$; comprising Mn, Cr, Al, Si, and Cl as impurities) and cobalt oxide ($Co_3O_4$) were provided. These raw materials were weighed so that w=0.390, x=0.173, z=9.11, and m=0.240 in the ferrite sintered magnet comprising metallic elements at an atomic ratio represented by formula (1a) and mixed. The obtained raw material mixture was mixed and pulverized in a wet attritor for 5 hours, and then dried to obtain a raw material powder.

$$Ca_{1-w-x}La_wSr_xFe_zCo_m \tag{1a}$$

<Calcination and Pulverization Steps>

The raw material powder was calcined in the air atmosphere at 1200° C. for 2 hours to obtain a calcined body. The obtained calcined body was coarsely pulverized with a small rod vibrating mill so that the specific surface area determined by the BET method was 0.5 to 2.5 m²/g. The obtained coarsely pulverized material was finely pulverized for 32 hours using a wet ball mill to obtain slurry for wet molding having finely pulverized particles wherein the specific surface area determined by the BET method was 7.0 to 10 m²/g. The slurry for wet molding was obtained by dehydrating the slurry after fine pulverization with a centrifuge, and adjusting the solid content concentration to 70 to 80% by mass.

<Molding and Firing Steps>

The slurry for wet molding was molded in an applied magnetic field of 10 kOe using a wet magnetic field molding machine to obtain a circular cylindrical green compact having 30 mm in diameter and 15 mm in thickness. The obtained green compact was fully dried in the air atmosphere at room temperature. Then, firing was performed in the air atmosphere at 1200° C. for 1 hour to obtain the ferrite sintered magnet of Example 1.

Examples 2 to 28 and Comparative Examples 1 to 8

The ferrite sintered magnets of Examples 2 to 28 and Comparative Examples 1 to 8 were obtained in the same way as in Example 1 except that the blending ratio of the raw materials was changed as shown in Tables 1 and 2.

Comparative Example 9 and Comparative Example 10

The procedure was performed in the same way as in Example 4 except that the mixing and pulverization time in a wet attritor in the step of preparing the raw material powder was changed from 5 hours to 1 hour and 0.5 hours, respectively, as shown in Table 3.

Example 29, Comparative Example 11 and Comparative Example 12

The procedure was performed in the same way as in Example 4 except that the calcination temperature was changed from 1200° C. to 1170° C., 1250° C. and 1300° C., respectively, as shown in Table 3.

Examples 30 to 34 and Comparative Example 13

As shown in Table 4, boric acid ($H_3BO_3$) was further provided as a raw material of the metallic elements constituting ferrite sintered magnets. The ferrite sintered magnets of Examples 30 to 34 and Comparative Example 13 were obtained in the same way as in Example 4 except that boric acid was weighed so that the content of boron was 0.037% by mass, 0.072% by mass, 0.109% by mass, 0.144% by mass, 0.181% by mass and 0.215% by mass, respectively, in terms of $H_3BO_3$ on the basis of the whole obtained ferrite sintered magnet and added to the above-mentioned mixture in the raw material powder preparation step.

Examples 35 to 38 and Comparative Example 14

As shown in Table 4, aluminum oxide ($Al_2O_3$) was further provided as a raw material of the metallic elements constituting ferrite sintered magnets. The ferrite sintered magnets of Examples 35 to 38 and Comparative Example 14 were obtained in the same way as in Example 4 except that aluminum oxide was weighed so that the content of aluminum was 0.03% by mass, 0.10% by mass, 0.20% by mass, 0.30% by mass and 0.40% by mass, respectively, in terms of $Al_2O_3$ on the basis of the whole obtained ferrite sintered magnet and these were added to the above-mentioned mixture in the raw material powder preparation step.

Examples 39 to 42

Barium oxide (BaO) was further provided as a raw material of a metallic element constituting a ferrite sintered magnet as shown in Table 4. The ferrite sintered magnet of Examples 39 to 42 was obtained in the same way as in Example 4 except that barium oxide was weighed so that the content of barium was 0.013% by mass, 0.026% by mass, 0.051% by mass and 0.068% by mass, respectively, in terms of BaO on the basis of the whole obtained ferrite sintered magnet, and these were added to the above-mentioned mixture in the raw material powder preparation step.

Example 43

The ferrite sintered magnet of Example 43 was obtained in the same way as in Example 4 except that boric acid and aluminum oxide were added to the above-mentioned mixture in the step of preparing a raw material powder so that the content of boron was 0.144% by mass in terms of $H_3BO_3$ and the content of aluminum was 0.05% by mass on the basis of the whole obtained ferrite sintered magnet as shown in Table 4.

Example 44

The ferrite sintered magnet of Example 44 was obtained in the same way as in Example 4 except that boric acid, aluminum oxide and barium oxide were weighed and added to the above-mentioned mixture in the step of preparing a raw material powder so that the content of boron was 0.144% by mass in terms of $H_3BO_3$, and the content of aluminum was 0.05% by mass in terms of $Al_2O_3$, and the content of barium was 0.051% by mass in terms of BaO on the basis of the whole obtained ferrite sintered magnet as shown in Table 4.

Example 45 and Comparative Examples 15 and 16

The procedure was performed in the same way as in Example 32 except that the calcination temperature was changed from 1200° C. to 1170° C., 1250° C. and 1300° C., respectively, as shown in Table 5.

(Evaluation Method)
[Magnetic Properties]
The upper and lower sides of each cylindrical ferrite sintered magnet obtained by Examples and Comparative Examples were processed, then the residual magnetic flux densities Br (mT) and coercive forces HcJ (kA/m) thereof were determined, and external magnetic field intensities (Hk) when the magnetic flux densities were 90% of the Br were measured using a B-H tracer at a maximum applied magnetic field of 25 kOe. The squareness ratio Hk/HcJ was calculated from the measurement results of Hk and HcJ. The values of Br, HcJ and Hk/HcJ are shown in Table 1 to 5.

[Sintering Temperature Dependence]
In each of Examples and Comparative Examples, a ferrite sintered magnet was further manufactured in the same way as in each of Examples and Comparative Examples except that the sintering temperature was 10° C. higher than 1200° C., and the coercive force HcJ was determined. ΔHcJ/ΔT was obtained by dividing the difference ΔHcJ due to the different sintering temperatures by the difference ΔT in sintering temperature. When ΔHcJ/ΔT≤2.0 was satisfied, it was determined that the sintering temperature dependence was good.

[Average Size and Coefficient of Variation (CV Value) of Crystal Grains of Ferrite Sintered Magnet]
A section parallel to the direction of the c axis (axis of easy magnetization) of the obtained ferrite sintered magnet was cut out, and the section was subjected to mirror-finished surface polishing and etching treatment with fluoric acid (at a concentration of 36%). Subsequently, the etching-treated surface was observed with a scanning electron microscope (SEM), and the sectional image of crystal grains was obtained. The crystal grain sectional image obtained by SEM observation was subjected to image analysis processing, and the maximum value Lmax of the overlapping length of the crystal grain and a straight line passing through the center of gravity g of each crystal grain was measured as the size of the crystal grain as to each grain. The arithmetic mean of the size AV and the standard deviation of the size σ of 500 grains were determined by such a technique, and the coefficient of variation (CV value) was calculated by σ/AV.

TABLE 1

| | $Ca_{1-w-x}La_wSr_xFe_zCo_m$ | | | | | B content in terms of $H_3BO_3$ (% by mass) | Al content in terms of $Al_2O_3$ (% by mass) | Ba content in terms of BaO (% by mass) | Calcination temp. (° C.) |
|---|---|---|---|---|---|---|---|---|---|
| | Ca $1-w-x$ | La $w$ | Sr $x$ | Fe $z$ | Co $m$ | | | | |
| Comp. Ex. 1 | 0.432 | 0.390 | 0.178 | 9.12 | 0.239 | 0 | 0 | 0 | 1200 |
| Example 1 | 0.437 | 0.390 | 0.173 | 9.11 | 0.240 | 0 | 0 | 0 | 1200 |
| Example 2 | 0.440 | 0.391 | 0.169 | 9.10 | 0.239 | 0 | 0 | 0 | 1200 |
| Example 3 | 0.449 | 0.390 | 0.161 | 9.10 | 0.240 | 0 | 0 | 0 | 1200 |
| Example 4 | 0.463 | 0.388 | 0.149 | 9.14 | 0.241 | 0 | 0 | 0 | 1200 |
| Example 5 | 0.469 | 0.390 | 0.141 | 9.10 | 0.240 | 0 | 0 | 0 | 1200 |
| Example 6 | 0.482 | 0.388 | 0.130 | 9.10 | 0.240 | 0 | 0 | 0 | 1200 |
| Example 7 | 0.491 | 0.390 | 0.119 | 9.13 | 0.241 | 0 | 0 | 0 | 1200 |
| Comp. Ex. 2 | 0.501 | 0.392 | 0.107 | 9.10 | 0.240 | 0 | 0 | 0 | 1200 |
| Comp. Ex. 3 | 0.470 | 0.353 | 0.177 | 9.10 | 0.240 | 0 | 0 | 0 | 1200 |
| Example 8 | 0.472 | 0.360 | 0.168 | 9.10 | 0.238 | 0 | 0 | 0 | 1200 |
| Example 9 | 0.470 | 0.371 | 0.159 | 9.13 | 0.240 | 0 | 0 | 0 | 1200 |
| Example 10 | 0.469 | 0.380 | 0.151 | 9.10 | 0.241 | 0 | 0 | 0 | 1200 |
| Example 11 | 0.469 | 0.390 | 0.141 | 9.10 | 0.240 | 0 | 0 | 0 | 1200 |
| Example 12 | 0.470 | 0.399 | 0.131 | 9.10 | 0.237 | 0 | 0 | 0 | 1200 |
| Example 13 | 0.468 | 0.409 | 0.123 | 9.07 | 0.240 | 0 | 0 | 0 | 1200 |
| Example 14 | 0.470 | 0.420 | 0.110 | 9.10 | 0.240 | 0 | 0 | 0 | 1200 |
| Comp. Ex. 4 | 0.471 | 0.430 | 0.099 | 9.10 | 0.240 | 0 | 0 | 0 | 1200 |

TABLE 1-continued

|  | Br (mT) | HcJ (kA/m) | Hk/HcJ (%) | Arithmetic mean size of grains [μm] | CV value of size of grains [%] | Firing temperature dependence of HcJ ΔHcj/° C. |
| --- | --- | --- | --- | --- | --- | --- |
| Comp. Ex. 1 | 465.0 | 387.2 | 91.1 | 1.40 | 48.8 | 3.2 |
| Example 1 | 465.4 | 400.1 | 91.0 | 1.48 | 42.9 | 1.91 |
| Example 2 | 466.0 | 404.4 | 90.8 | 1.51 | 40.8 | 1.78 |
| Example 3 | 467.2 | 408.7 | 90.2 | 1.74 | 42.7 | 1.99 |
| Example 4 | 466.7 | 406.7 | 90.8 | 1.67 | 37.8 | 1.63 |
| Example 5 | 466.8 | 406.1 | 91.1 | 1.66 | 36.8 | 1.70 |
| Example 6 | 466.1 | 406.7 | 91.3 | 1.57 | 32.9 | 1.48 |
| Example 7 | 466.0 | 407.7 | 89.8 | 1.78 | 41.7 | 1.98 |
| Comp. Ex. 2 | 465.1 | 389.6 | 91.1 | 1.88 | 63.3 | 3.32 |
| Comp. Ex. 3 | 450.8 | 388.1 | 90.8 | 1.46 | 45.9 | 2.82 |
| Example 8 | 458.0 | 400.2 | 90.4 | 1.47 | 36.0 | 1.91 |
| Example 9 | 466.1 | 401.8 | 89.5 | 1.42 | 34.3 | 1.78 |
| Example 10 | 467.7 | 409.6 | 91.9 | 1.51 | 40.0 | 1.99 |
| Example 11 | 466.8 | 406.1 | 91.1 | 1.60 | 36.9 | 1.63 |
| Example 12 | 467.2 | 406.7 | 90.9 | 1.62 | 36.0 | 1.09 |
| Example 13 | 466.2 | 407.9 | 89.5 | 1.57 | 41.7 | 1.48 |
| Example 14 | 456.5 | 401.8 | 91.0 | 1.67 | 42.9 | 1.99 |
| Comp. Ex. 4 | 453.3 | 394.9 | 89.8 | 1.69 | 45.1 | 2.47 |

TABLE 2

|  | $Ca_{1-w-x}La_wSr_xFe_zCo_m$ | | | | | B content in terms of $H_3BO_3$ (% by mass) | Al content in terms of $Al_2O_3$ (% by mass) | Ba content in terms of BaO (% by mass) | Calcination temp. (° C.) |
| --- | --- | --- | --- | --- | --- | --- | --- | --- | --- |
|  | Ca $1-w-x$ | La $w$ | Sr $x$ | Fe $z$ | Co $m$ |  |  |  |  |
| Comp. Ex. 5 | 0.472 | 0.388 | 0.140 | 8.32 | 0.238 | 0 | 0 | 0 | 1200 |
| Example 15 | 0.470 | 0.390 | 0.140 | 8.51 | 0.239 | 0 | 0 | 0 | 1200 |
| Example 16 | 0.468 | 0.390 | 0.142 | 8.71 | 0.238 | 0 | 0 | 0 | 1200 |
| Example 17 | 0.470 | 0.388 | 0.142 | 8.89 | 0.240 | 0 | 0 | 0 | 1200 |
| Example 18 | 0.469 | 0.390 | 0.141 | 9.10 | 0.240 | 0 | 0 | 0 | 1200 |
| Example 19 | 0.472 | 0.385 | 0.143 | 9.29 | 0.240 | 0 | 0 | 9 | 1200 |
| Example 20 | 0.470 | 0.390 | 0.140 | 9.48 | 0.241 | 0 | 0 | 0 | 1200 |
| Example 21 | 0.470 | 0.392 | 0.138 | 9.71 | 0.240 | 0 | 0 | 0 | 1200 |
| Comp. Ex. 6 | 0.471 | 0.390 | 0.139 | 9.90 | 0.241 | 0 | 0 | 0 | 1200 |
| Comp. Ex. 7 | 0.470 | 0.389 | 0.141 | 9.10 | 0.200 | 0 | 0 | 0 | 1200 |
| Example 22 | 0.469 | 0.390 | 0.141 | 9.10 | 0.208 | 0 | 0 | 0 | 1200 |
| Example 23 | 0.470 | 0.391 | 0.139 | 9.11 | 0.218 | 0 | 0 | 0 | 1200 |
| Example 24 | 0.467 | 0.391 | 0.142 | 9.11 | 0.230 | 0 | 0 | 0 | 1200 |
| Example 25 | 0.469 | 0.390 | 0.141 | 9.10 | 0.240 | 0 | 0 | 0 | 1200 |
| Example 26 | 0.470 | 0.390 | 0.140 | 9.08 | 0.250 | 0 | 0 | 0 | 1200 |
| Example 27 | 0.473 | 0.387 | 0.140 | 9.10 | 0.257 | 0 | 0 | 0 | 1200 |
| Example 28 | 0.470 | 0.390 | 0.140 | 9.07 | 0.269 | 0 | 0 | 0 | 1200 |
| Comp. Ex. 8 | 0.471 | 0.390 | 0.139 | 9.10 | 0.281 | 0 | 0 | 0 | 1200 |

|  | Br (mT) | HcJ (kA/m) | Hk/HcJ (%) | Arithmetic mean size of grains [μm] | CV value of size of grains [%] | Firing temperature dependence of HcJ ΔHcj/° C. |
| --- | --- | --- | --- | --- | --- | --- |
| Comp. Ex. 5 | 455.6 | 382.9 | 81.8 | 1.51 | 45.3 | 2.32 |
| Example 15 | 462.1 | 400.3 | 86.1 | 1.49 | 32.5 | 1.68 |
| Example 16 | 464.2 | 401.8 | 88.2 | 1.39 | 31.4 | 1.56 |
| Example 17 | 465.3 | 404.7 | 87.6 | 1.39 | 31.3 | 1.42 |
| Example 18 | 466.8 | 406.1 | 91.1 | 1.30 | 29.0 | 1.29 |
| Example 19 | 466.1 | 406.7 | 89.8 | 1.46 | 32.9 | 1.49 |
| Example 20 | 465.6 | 400.5 | 90.3 | 1.46 | 31.7 | 1.35 |
| Example 21 | 464.9 | 400.3 | 89.4 | 1.61 | 42.9 | 1.75 |
| Comp. Ex. 6 | 464.1 | 377.3 | 87.9 | 1.62 | 45.4 | 2.19 |
| Comp. Ex. 7 | 457.0 | 378.3 | 91.4 | 1.45 | 45.9 | 2.32 |
| Example 22 | 461.2 | 400.0 | 91.3 | 1.31 | 32.9 | 1.43 |
| Example 23 | 463.1 | 400.2 | 90.5 | 1.36 | 30.1 | 1.35 |
| Example 24 | 466.1 | 405.7 | 91.0 | 1.30 | 30.0 | 1.38 |
| Example 25 | 466.8 | 406.1 | 91.1 | 1.52 | 31.3 | 1.41 |
| Example 26 | 464.1 | 416.5 | 90.0 | 1.55 | 33.4 | 1.22 |

TABLE 2-continued

|  |  |  |  |  |  |  |
|---|---|---|---|---|---|---|
| Example 27 | 462.2 | 423.7 | 89.5 | 1.43 | 34.1 | 1.35 |
| Example 28 | 463.1 | 431.2 | 85.9 | 1.38 | 37.2 | 1.49 |
| Comp. Ex. 8 | 453.4 | 428.3 | 82.1 | 1.48 | 46.2 | 2.29 |

TABLE 3

| | $Ca_{1-w-x}La_wSr_xFe_zCo_m$ | | | | | B content in terms of | Al content in terms of | Ba content in terms of | Calcination |
|---|---|---|---|---|---|---|---|---|---|
| | Ca $1-w-x$ | La $w$ | Sr $x$ | Fe $z$ | Co $m$ | $H_3BO_3$ (% by mass) | $Al_2O_3$ (% by mass) | BaO (% by mass) | temp. (° C.) |
| Example 4 | 0.463 | 0.388 | 0.149 | 9.14 | 0.241 | 0 | 0 | 0 | 1200 |
| Comp. Ex. 9 | 0.463 | 0.388 | 0.149 | 9.14 | 0.241 | 0 | 0 | 0 | 1200 |
| Comp. Ex. 10 | 0.463 | 0.388 | 0.149 | 9.14 | 0.241 | 0 | 0 | 0 | 1200 |
| Example 29 | 0.463 | 0.388 | 0.149 | 9.14 | 0.241 | 0 | 0 | 0 | 1170 |
| Comp. Ex. 11 | 0.463 | 0.388 | 0.149 | 9.14 | 0.241 | 0 | 0 | 0 | 1250 |
| Comp. Ex. 12 | 0.463 | 0.388 | 0.149 | 9.14 | 0.241 | 0 | 0 | 0 | 1300 |

| | Br (mT) | HcJ (kA/m) | Hk/HcJ (%) | Arithmetic mean size of grains [μm] | CV value of size of grains [%] | Firing temperature dependence of HcJ ΔHcj/° C. |
|---|---|---|---|---|---|---|
| Example 4 | 466.7 | 406.7 | 90.8 | 1.67 | 37.8 | 1.63 |
| Comp. Ex. 9 | 466.2 | 406.3 | 90.9 | 1.62 | 45.1 | 2.35 |
| Comp. Ex. 10 | 465.4 | 407.7 | 91.0 | 1.63 | 47.7 | 2.71 |
| Example 29 | 460.1 | 412.3 | 90.4 | 1.47 | 32.1 | 1.39 |
| Comp. Ex. 11 | 470.4 | 402.2 | 91.3 | 1.71 | 45.0 | 2.58 |
| Comp. Ex. 12 | 474.8 | 398.4 | 91.5 | 1.83 | 50.0 | 2.99 |

TABLE 4

| | $Ca_{1-w-x}La_wSr_xFe_zCo_m$ | | | | | B content in terms of | Al content in terms of | Ba content in terms of | Calcination |
|---|---|---|---|---|---|---|---|---|---|
| | Ca $1-w-x$ | La $w$ | Sr $x$ | Fe $z$ | Co $m$ | $H_3BO_3$ (% by mass) | $Al_2O_3$ (% by mass) | BaO (% by mass) | temp. (° C.) |
| Example 4 | 0.463 | 0.388 | 0.149 | 9.14 | 0.241 | 0 | 0 | 0 | 1200 |
| Example 30 | 0.463 | 0.388 | 0.149 | 9.14 | 0.241 | 0.037 | 0 | 0 | 1200 |
| Example 31 | 0.463 | 0.388 | 0.149 | 9.14 | 0.241 | 0.072 | 0 | 0 | 1200 |
| Example 32 | 0.463 | 0.388 | 0.149 | 9.14 | 0.241 | 0.109 | 0 | 0 | 1200 |
| Example 33 | 0.463 | 0.388 | 0.149 | 9.14 | 0.241 | 0.144 | 0 | 0 | 1200 |
| Example 34 | 0.463 | 0.388 | 0.149 | 9.14 | 0.241 | 0.181 | 0 | 0 | 1200 |
| Comp. Ex. 13 | 0.463 | 0.388 | 0.149 | 9.14 | 0.241 | 0.215 | 0 | 0 | 1200 |
| Example 35 | 0.463 | 0.388 | 0.149 | 9.14 | 0.241 | 0 | 0.03 | 0 | 1200 |
| Example 36 | 0.463 | 0.388 | 0.149 | 9.14 | 0.241 | 0 | 0.10 | 0 | 1200 |
| Example 37 | 0.463 | 0.388 | 0.149 | 9.14 | 0.241 | 0 | 0.20 | 0 | 1200 |
| Example 38 | 0.463 | 0.388 | 0.149 | 9.14 | 0.241 | 0 | 0.30 | 0 | 1200 |
| Comp. Ex. 14 | 0.463 | 0.388 | 0.149 | 9.14 | 0.241 | 0 | 0.40 | 0 | 1200 |
| Example 39 | 0.463 | 0.388 | 0.149 | 9.14 | 0.241 | 0 | 0 | 0.013 | 1200 |
| Example 40 | 0.463 | 0.388 | 0.149 | 9.14 | 0.241 | 0 | 0 | 0.026 | 1200 |
| Example 41 | 0.463 | 0.388 | 0.149 | 9.14 | 0.241 | 0 | 0 | 0.051 | 1200 |
| Example 42 | 0.463 | 0.388 | 0.149 | 9.14 | 0.241 | 0 | 0 | 0.068 | 1200 |
| Example 43 | 0.463 | 0.388 | 0.149 | 9.14 | 0.241 | 0.144 | 0.05 | 0 | 1200 |
| Example 44 | 0.463 | 0.388 | 0.149 | 9.14 | 0.241 | 0.144 | 0.05 | 0.051 | 1200 |

| | Br (mT) | HcJ (kA/m) | Hk/HcJ (%) | Arithmetic mean size of grains [μm] | CV value of size of grains [%] | Firing temperature dependence of HcJ ΔHcj/° C. |
|---|---|---|---|---|---|---|
| Example 4 | 466.7 | 406.7 | 90.8 | 1.67 | 37.8 | 1.63 |
| Example 30 | 467.5 | 409.2 | 89.9 | 1.52 | 36.6 | 1.55 |
| Example 31 | 467.5 | 411.0 | 89.8 | 1.61 | 33.3 | 1.42 |
| Example 32 | 464.8 | 409.1 | 90.9 | 1.44 | 32.4 | 1.53 |
| Example 33 | 463.5 | 408.0 | 89.3 | 1.55 | 34.0 | 1.65 |
| Example 34 | 462.0 | 412.5 | 90.9 | 1.60 | 35.2 | 1.70 |

TABLE 4-continued

| | | | | | | |
|---|---|---|---|---|---|---|
| Comp. Ex. 13 | 461.5 | 417.3 | 91.1 | 1.60 | 45.1 | 2.05 |
| Example 35 | 464.2 | 423.5 | 88.9 | 1.54 | 35.5 | 1.68 |
| Example 36 | 464.0 | 425.0 | 88.8 | 1.44 | 34.3 | 1.55 |
| Example 37 | 462.9 | 420.6 | 89.4 | 1.45 | 34.0 | 1.54 |
| Example 38 | 460.3 | 419.2 | 90.1 | 1.66 | 36.7 | 1.55 |
| Comp. Ex. 14 | 458.7 | 410.5 | 90.4 | 1.67 | 45.3 | 2.03 |
| Example 39 | 465.4 | 408.7 | 90.9 | 1.66 | 34.5 | 1.38 |
| Example 40 | 464.2 | 410.7 | 91.0 | 1.62 | 35.4 | 1.40 |
| Example 41 | 465.5 | 409.8 | 91.4 | 1.43 | 35.9 | 1.44 |
| Example 42 | 463.2 | 404.4 | 91.0 | 1.70 | 39.9 | 1.99 |
| Example 43 | 457.6 | 414.4 | 89.3 | 1.59 | 33.0 | 1.21 |
| Example 44 | 457.5 | 414.5 | 89.4 | 1.57 | 32.1 | 1.19 |

TABLE 5

| | $Ca_{1-w-x}La_wSr_xFe_zCo_m$ | | | | | B content in terms of $H_3BO_3$ (% by mass) | Al content in terms of $Al_2O_3$ (% by mass) | Ba content in terms of BaO (% by mass) | Calcination temp. (° C.) |
|---|---|---|---|---|---|---|---|---|---|
| | Ca 1 − w − x | La w | Sr x | Fe z | Co m | | | | |
| Example 45 | 0.463 | 0.388 | 0.149 | 9.14 | 0.241 | 0.109 | 0 | 0 | 1170 |
| Example 32 | 0.463 | 0.388 | 0.149 | 9.14 | 0.241 | 0.109 | 0 | 0 | 1200 |
| Comp. Ex. 15 | 0.463 | 0.388 | 0.149 | 9.14 | 0.241 | 0.109 | 0 | 0 | 1250 |
| Comp. Ex. 16 | 0.463 | 0.388 | 0.149 | 9.14 | 0.241 | 0.109 | 0 | 0 | 1300 |

| | Br (mT) | HcJ (kA/m) | Hk/HcJ (%) | Arithmetic mean size of grains [μm] | CV value of size of grains [%] | Firing temperature dependence of HcJ ΔHcj/° C. |
|---|---|---|---|---|---|---|
| Example 45 | 460.5 | 413.2 | 91.2 | 1.43 | 33.5 | 1.41 |
| Example 32 | 464.8 | 409.1 | 90.9 | 1.44 | 32.4 | 1.53 |
| Comp. Ex. 15 | 468.1 | 395.2 | 90.2 | 1.92 | 46.2 | 2.12 |
| Comp. Ex. 16 | 469.4 | 380.6 | 87.3 | 1.99 | 53.5 | 2.32 |

As is clear from the evaluation results in Tables 1 to 5, ferrite sintered magnets wherein the ferrite sintered magnets comprised Ca, La, Sr, Fe and Co in extremely limited ranges, and the coefficient of variation (CV value) of the size of the grains was less than 45% had reduced firing temperature dependence while a coercive force, HcJ, of 400 kA/m or more was exhibited. This tendency did not change in the systems comprising B, the systems comprising Al, and the systems comprising Ba, either. It was found from the evaluation results of Examples 36 to 40 that the grain growth at the time of calcination could be suppressed, the size of crystal grains could be reduced, and the coercive force HcJ of a ferrite sintered magnet could be improved by adding aluminum oxide in the manufacturing of the ferrite sintered magnet.

REFERENCE SINGS LIST

100: ferrite sintered magnet, CG: grain, g: center of gravity.

What is claimed is:

1. A ferrite sintered magnet comprising ferrite crystal grains having a hexagonal structure,
    wherein the ferrite sintered magnet comprises metallic elements at an atomic ratio represented by formula (1):

$$Ca_{1-w-x}R_wSr_xFe_zCo_m \quad (1)$$

and wherein R is at least one element selected from the group consisting of Bi and rare-earth elements, R comprises at least La, w, x, z and m satisfy formulae (2) to (5):

$$0.360 \le w \le 0.420 \quad (2)$$

$$0.110 \le x \le 0.173 \quad (3)$$

$$8.51 \le z \le 9.71 \quad (4)$$

$$0.208 \le m \le 0.269 \quad (5)$$

and a coefficient of variation of a size of the crystal grains in a section parallel to a c axis is less than 45%.

2. The ferrite sintered magnet according to claim 1, wherein the ferrite sintered magnet further comprises 0.037 to 0.181% by mass of B in terms of $H_3BO_3$.

3. The ferrite sintered magnet according to claim 1, wherein the ferrite sintered magnet further comprises 0.03 to 0.3% by mass of Al in terms of $Al_2O_3$.

4. The ferrite sintered magnet according to claim 1, wherein the ferrite sintered magnet further comprises 0.001 to 0.068% by mass of Ba in terms of BaO.

* * * * *